Jan. 29, 1935. J. M. BOOE 1,989,129
DIALYZING PAPER CONDENSER
Filed May 15, 1934

INVENTOR
James M. Booe
BY
ATTORNEY

Patented Jan. 29, 1935

1,989,129

UNITED STATES PATENT OFFICE 1,989,129

DIALYZING PAPER CONDENSER

James Marvin Booe, Indianapolis, Ind., assignor to P. R. Mallory & Co. Incorporated, Indianapolis, Ind., a corporation of Indiana Application May 15, 1934, Serial No. 725,745

18 Claims. (Cl. 175—315)

This invention relates to "dry" electrolytic condensers and more particularly to the combination therein of a novel separator, and furthermore includes the method by which both the separator is prepared and assembled in the condenser.

The objects of the invention are to provide an improved "dry" electrolytic condenser having a separator comprising a dialyzing membrane; to select the membrane from the more readily accessible vegetable, animal and inorganic dialyzing membranes; to more particularly utilize a vegetable dialyzing membrane between film-forming electrodes; to secure a desirable and proper impregnation of the membrane with a paste-like electrolyte; to treat the membrane for better receiving said electrolyte; to pre-treat the membrane so as to avoid wrinkling when the electrolyte is applied; to prolong the life of the condenser; to activate the membrane; to enable the condenser to avoid breakdown under temporary high over-voltages; to distribute leakage under overload conditions to substantially cover the entire surfaces of the electrodes; to secure a compact and light condenser; and to obtain other advantages and results as may be brought out in the following description.

Referring to the accompanying drawing in which like numerals of reference indicate similar parts throughout the several views.

It will be understood by those versed in the art, that electrical condensers are more generally classified as either electrostatic or electrolytic. Both types of condensers utilize separated plates or electrodes, and in an electrolytic condenser there is also an electrolyte. The electrolytic condensers may again be subdivided, as wet and dry, for although both include an electrolyte, the wet condenser includes the electrolyte in such form that it may spill on tilting the condenser, whereas the dry electrolytic condenser employs an electrolyte in such form that there is no free body of liquid to spill, it being common practice in condensers of this type, to employ a paste or viscous electrolyte. It is in such a condenser that my invention applies most advantageously.

Figure 3:
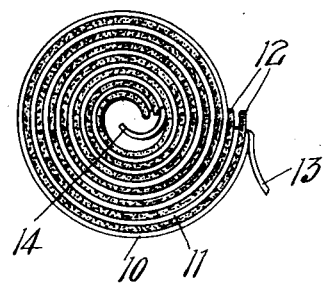
Figure 3 is a cross-sectional view of a coiled type of condenser utilizing the membrane of my invention.
Figure 4:
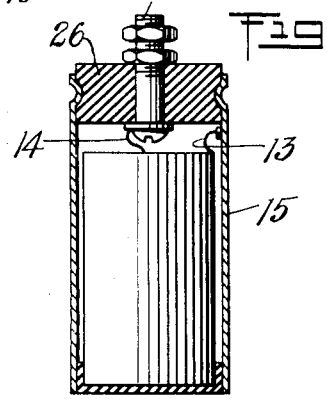
Figure 4 is an elevation of the coiled condenser, electrodes and membranes positioned within a container shown in longitudinal section.

By way of illustration, I have shown in Figure 3 a pair of coiled or spirally wound electrodes 10 and 11 which are separated from each other and from the next succeeding convolution by similarly wound separators 12. A lead-in wire 13 may be connected to one of these electrodes, as 10, and another lead-in wire 14 may be connected to the other. Preferably the wire 13 connects with the one electrode at the outer convolution thereof, whereas the other lead-in wire connects with the inner convolution of the second electrode. Furthermore, by way of illustration, I have shown the coiled electrodes and separators placed within a container 15 in Figure 4 with the outer lead-in wire 13 connected to the metallic shell of the container and the inner lead-in wire 14 connected to a terminal 16 electrically protected from the shell by intervening insulation 26. The general form of the condenser thus constructed is old in the art. (Ruben 1,710,073; 1,714,191; 1,918,716.)

In the construction of the condenser, the electrodes may be made of any desirable or suitable film-forming material, such as aluminum foil. These electrodes, 10 and 11, are separated from each other and from adjacent convolutions by means of dialyzing or osmotic separators. In carrying out this feature of the invention, I accordingly employ very thin membranes for the separators. Examples of such membranes which are contemplated and available are vegetable and animal dialyzing membranes. The preference is to utilize a vegetable parchment, of which an appropriate example is found in the various collodion papers or parchments obtainable in the open market. I find that such a vegetable parchment has osmotic properties, that is, will tend to draw fluid from one side thereof to pass through the parchment into an electrolyte on the other side of the parchment. This is conducive to electrodialysis, namely, the current passing through while the electrolyte segregates the anions with the anode and cations with the cathode. This separation is maintained as long as a current is flowing.

As animal membranes, may be indicated animal bladders, one readily available and suitable, being pig bladder. As an example of inorganic membranes, may be mentioned specifically a precipitation of copper-ferro-cyanide which has a suitable cellular structure.

Figure 1:
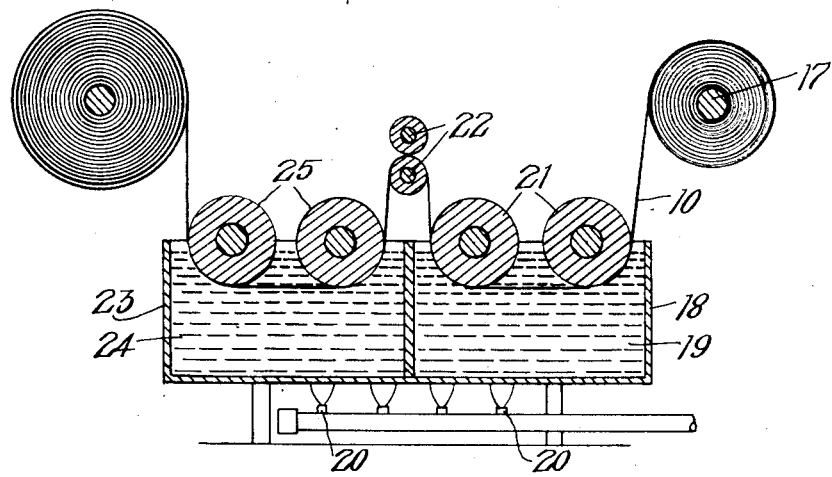
Figure 1 is a diagrammatic section view showing the method of preparing the membrane for use in the condenser.
Figure 2:
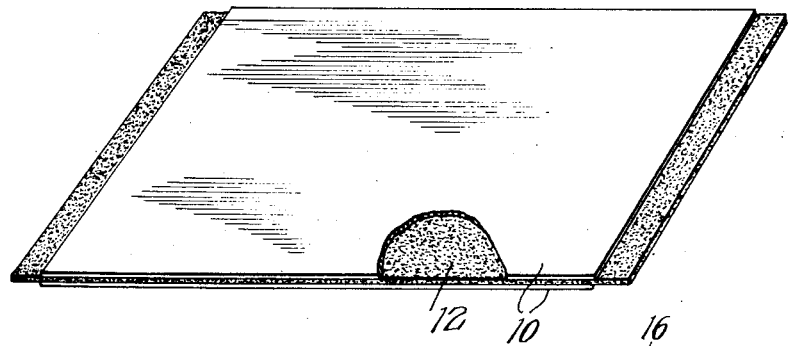
Figure 2 is a perspective view of a section of membrane with electrodes on opposite sides thereof.

In carrying out the method of manufacture, I preferably provide a long strip of the membrane, having indicated the same in Figure 1, as of such length that it may be conveniently coiled upon a spool or other mandrel 17.

In the preparation of the membrane, the same is preferably treated with distilled water. The activation can be performed in cold distilled water if desired, but it is preferable to use water that is heated in that the action of hot water is more rapid in activating the material as well as in removing impurities. For illustrative purposes, I have shown a tank 18 in which there is a quantity of distilled water 19 and which water is heated by a burner 20. Suitable means, such as idlers 21 cause the strip 10 to dip into the heated distilled water. The water 19 is further more preferably kept at or about the boiling point, and by virture thereof detrimental impurities inherent in the membrane will be removed and the character of the membrane improved in that respect. This treatment also activates the membrane before it is impregnated with the electrolytic paste. Furthermore, although for the sake of simplicity of the drawing, I have shown the membrane dipped into a single tank of water, it will be understood that the operation may be repeated as often as found desirable or necessary.

After the membrane has been properly and sufficiently activated in the water, it is preferably passed between squeezers 22, by which the excess water is removed and the membrane passes on in a wet or quite damp condition. If so desired, the membrane thus activated in the distilled water may be immediately wound or coiled and stored under water, also preferably distilled, for later impregnation or use.

It is a fact that when the membrane is activated and coiled wet, there remains about the required amount of water therein to allow good impregnation of an electrolyte when the membrane is made into condensers by machine rolling. According to the illustration of Figure 1, the membrane is dipped into a second tank 23 wherein is a quantity of electrolytic paste 24 in suitable manner as by idlers 25, to thoroughly impregnate the membrane with said paste. This paste is likewise heated as by burners 20, and then is either immediately used to form part of a condenser, or is rolled up as indicated in Figure 1, to be used as required. Application of the paste to the membrane obtains a film thereof which is maintained both in and on the membrane.

It is imperative that the activation with water be carried out before the membrane is impregnated with the paste, for otherwise hot paste in contact with a dry membrane will not penetrate into the fibers, or interstices, of the membrane, and will also cause severe shrinking and warping of the membrane. By first immersing the membrane in hot water, and thereafter immersing it in a paste, it is found that there is practically no warping and very thorough impregnation. Whatever shrinkage takes place under these conditions is of an even nature and is not detrimental. It may further be stated that it is necessary to remove the excess water after the activation of the paper in the water tank, since it is undesirable to dilute the paste and furthermore because the excess water has a tendency to prevent impregnation. By passing the membrane between squeezers 22, the membrane has a very even moisture condition, and this is conducive to an even impregnation.

It is within the scope of the invention to utilize an electrolyte of any desired or proper materials. By way of example, I may make mention of a suitable electrolyte composition of paste-like consistency formed from a mixture including a polyhydric alcohol falling within the classes of glycols and glycerols, a weak acid and a salt thereof. I prefer an ethylene glycol-ammonium borate-boric acid paste.

While the particular showing herein of condenser represents a coiled assembly of electrodes and separators, it is to be understood that the invention is not restricted to that shape alone, it being within the contemplation thereof to employ the invention in any assembly of juxtaposed electrodes and separators, and it is furthermore to be understood that other modifications and changes in the detail construction, assembly, and steps in the method of manufacture may be made without departing from the spirit or scope of the invention as set forth in greater particularity in the appended claims when construed in the light of the prior art.

I claim:

1. In an electrolytic condenser, an electrode separator comprising a dialyzing membrane.

2. In an electrolytic condenser, an electrode separator comprising a dialyzing membrane selected from the vegetable, animal and inorganic membranes.

3. In an electrolytic condenser, an electrode separator comprising a vegetable dialyzing membrane.

4. In an electrolytic condenser, an electrode separator comprising a parchment paper membrane.

5. An electrolytic condenser comprising electrodes separated by a dialyzing membrane impregnated with an electrolyte.

6. An electrolytic condenser comprising electrodes separated by a dialyzing membrane selected from the vegetable, animal and inorganic membranes impregnated with an electrolyte.

7. An electrolytic condenser comprising electrodes separated by a vegetable dialyzing membrane impregnated with an electrolyte.

8. An electrolytic condenser comprising electrodes separated by a parchment paper membrane impregnated with an electrolyte.

9. In an electrolytic condenser, the combination comprising a film-formed positive electrode, a negative electrode, and a dialyzing membrane separating said electrodes.

10. In an electrolytic condenser, the combination comprising two film-forming electrodes and an impregnated dialyzing membrane therebetween and juxtaposed with respect to both said electrodes.

11. In an electrolytic condenser of the dry type, the combination with film-forming electrodes and a viscous film-maintaining electrolyte composition between said electrodes, of a dialyzing membrane separating said electrodes and impregnated with said electrolytic composition.

12. In an electrolytic condenser of the dry type, the combination with film-forming electrodes, and a film-maintaining electrolyte composition formed from a mixture including a polyhydric alcohol falling within the classes of glycols and glycerols and a weak acid, of a dialyzing membrane separating said electrodes and impregnated with said electrolyte composition.

13. In an electrolytic condenser of the dry type, the combination with film-forming electrodes, and a viscous film-maintaining electrolyte composition formed from a polyhydric alcohol falling within the classes of glycols and glycerols, boric acid and a salt thereof, of a dialyzing membrane separating said electrodes and impregnated with said electrolyte composition.

14. In an electrolytic condenser of the wet type, the combination with film-forming electrodes, and a liquid film-maintaining electrolyte composition of a dialyzing membrane separating said electrodes and impregnated with said electrolyte composition.

15. A method of making electrolytic condenser comprising activating a dialyzing membrane in water and assembling said activated membrane with a pair of condenser electrodes to cause said membrane to separate the latter, said activated membrane being saturated with a film-maintaining electrolyte composition.

16. A method of making electrolytic condensers comprising boiling a dialyzing membrane in distilled water to activate the same, and assembling said activated membrane with a pair of condenser electrodes to cause said membrane to separate the latter, said activated membrane being saturated with a film-maintaining electrolyte composition.

17. A method of making electrolytic condensers comprising immersing a vegetable dialyzing membrane in hot distilled water to activate the same, and assembling said activated membrane with a pair of condenser electrodes to cause said membrane to separate the latter, said activated membrane being saturated with a film-maintaining electrolyte composition.

18. A method of making electrolytic condensers comprising immersing a vegetable dialyzing membrane in hot distilled water to activate the same, removing excess water therefrom, and assembling said activated membrane with a pair of condenser electrodes to cause said membrane to separate the latter, said activated membrane being saturated with a film-maintaining electrolyte composition.

JAMES MARVIN BOOE.